United States Patent [19]

Smith

[11] Patent Number: 5,608,552
[45] Date of Patent: Mar. 4, 1997

[54] LIQUID CRYSTAL DISPLAY HAVING AN OFF-AXIS FULL-COLOR HOLOGRAPHIC FILTER

[75] Inventor: Ronald T. Smith, Corona Del Mar, Calif.

[73] Assignee: Hughes Electronics, Los Angeles, Calif.

[21] Appl. No.: 578,794

[22] Filed: Dec. 26, 1995

[51] Int. Cl.$^6$ .................................................. G02F 1/1335
[52] U.S. Cl. ...................................... 349/5; 349/9; 349/96; 349/106
[58] Field of Search ................................ 359/40, 41, 48, 359/49, 63, 68, 22, 20

[56] References Cited

U.S. PATENT DOCUMENTS

| | | | |
|---|---|---|---|
| 4,653,867 | 3/1987 | Urabe et al. | 359/41 |
| 5,042,921 | 8/1991 | Sato et al. | 359/40 |
| 5,153,752 | 10/1992 | Kurematsu et al. | 359/40 |
| 5,200,843 | 4/1993 | Karasawa et al. | 359/40 |
| 5,267,060 | 11/1993 | Colton | 359/15 |
| 5,278,680 | 1/1994 | Karasawa et al. | 359/40 |
| 5,283,600 | 2/1994 | Imai | 359/48 |
| 5,333,072 | 7/1994 | Willet | 359/41 |
| 5,387,991 | 2/1995 | Mitsutake et al. | 359/40 |

FOREIGN PATENT DOCUMENTS

0597261A1  5/1994  European Pat. Off. .

Primary Examiner—Anita Pellman Gross
Assistant Examiner—Toan Ton
Attorney, Agent, or Firm—Leonard A. Alkov; Wanda K. Denson-Low

[57] ABSTRACT

A full-color liquid crystal display employing an off-axis holographic color filter. The liquid crystal display comprises a liquid crystal spatial light modulator that includes a mosaic of electrically independent picture elements. An illumination source is provided that produces nearly collimated white predominantly S polarized illuminating light. The holographic color filter is disposed adjacent the liquid crystal spatial light modulator that comprises three layers of overlapping holographic lenses designed to focus red, green, and blue light, respectively, onto corresponding picture elements of the spatial light modulator. A prism element is disposed adjacent to the holographic color filter for coupling the illuminating light from the illumination source to the holographic color filter. A polarizer is disposed on an output surface of the prism element opposite from the holographic color filter that transmits P polarized light but blocks S polarized light. A projection optical system is disposed to receive P polarized light transmitted by the polarizer and produce an image for viewing.

15 Claims, 2 Drawing Sheets

GREEN HOLOGRAM CHARACTERISTICS

LIQUID CRYSTAL DISPLAY HAVING AN OFF-AXIS FULL-COLOR HOLOGRAPHIC FILTER

BACKGROUND

The present invention relates generally to liquid crystal displays, and more particularly, to an off-axis holographic color filter, and a full-color liquid crystal display employing the off-axis holographic color filter.

U.S. Pat. No. 4,807,978 issued Feb. 28, 1989 and assigned to the assignee of the present invention discloses a technique of using three layers of holographic microlenses to separate incident white light into red, green, and blue components focused on the appropriate elements of a liquid crystal device. The invention of U.S. Pat. No. 4,807,978 was primarily concerned with providing illumination to a transparent liquid crystal device and did not consider the effects of the holographic elements when used with a reflective liquid crystal display device.

In a projection display system with a transparent liquid crystal device, the light separated and focused by the holographic elements passes through the liquid crystal spatial light modulator and then continues on to the projection optical system. On the other hand, in a projection display system with a reflective spatial light modulator, the image reflected from the spatial light modulator passes through the holographic elements a second time before reaching the projection optical system.

Prior art techniques used to form a full color projected image were (a) to use three spatial light modulators to create separate red, green and blue images and then superimpose the images by means of color selective beamsplitters, or (b) to use a single spatial light modulator device with a mosaic of absorptive filters to divide the device into red, green and blue picture elements.

Accordingly, it is an objective of the present invention to provide for an off-axis holographic color filter, and a full-color liquid crystal display employing the off-axis holographic color filter.

SUMMARY OF THE INVENTION

To meet the above and other objectives, the present invention provides for an off-axis holographic color filter, and a full-color liquid crystal display employing the off-axis holographic color filter. The liquid crystal display comprises a liquid crystal spatial light modulator that includes a mosaic of electrically independent picture elements. An illumination source is provided that produces nearly-collimated white predominantly S polarized illuminating light. The holographic color filter is disposed adjacent the liquid crystal spatial light modulator that comprises three layers of overlapping holographic lenses designed to focus red, green, and blue light, respectively, onto corresponding picture elements of the spatial light modulator. A prism element is disposed adjacent to the holographic color filter for coupling the illuminating light from the illumination source to the holographic color filter. A polarizer is disposed on an output surface of the prism element opposite from the holographic color filter that transmits P polarized light but blocks S polarized light. A projection optical system is disposed to receive P polarized light transmitted by the polarizer and produce an image for viewing.

The present invention provides for a filter that separates white light into red, green and blue components and directs these components to the appropriate picture elements of a reflective liquid crystal spatial light modulator (or light valve. This combination may be used in a large screen projection display system. One feature of the present filter is that colors are separated by means of holographic optical elements (or diffractive optical elements) that are designed to diffract the incident S polarized light but not diffract the P polarized image reflected from the liquid crystal device.

The present invention allows a single reflective spatial light modulator to form a full color projected image. This is an improvement over the prior art techniques discussed in the Background section. The present invention may be used to create a projection display system that is less complex and less cosily than technique (a) described above, and that is much more efficient in the use of illumination power than technique (b) described above.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
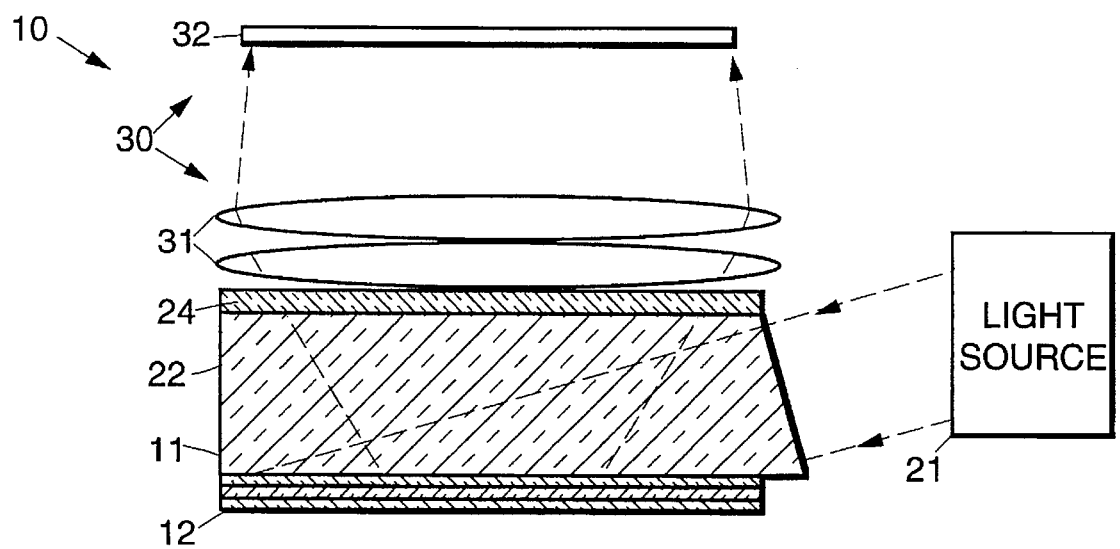
FIG. 1 illustrates a full-color liquid crystal display employing an off-axis holographic color filter in accordance with the present invention.
Figure 1A:
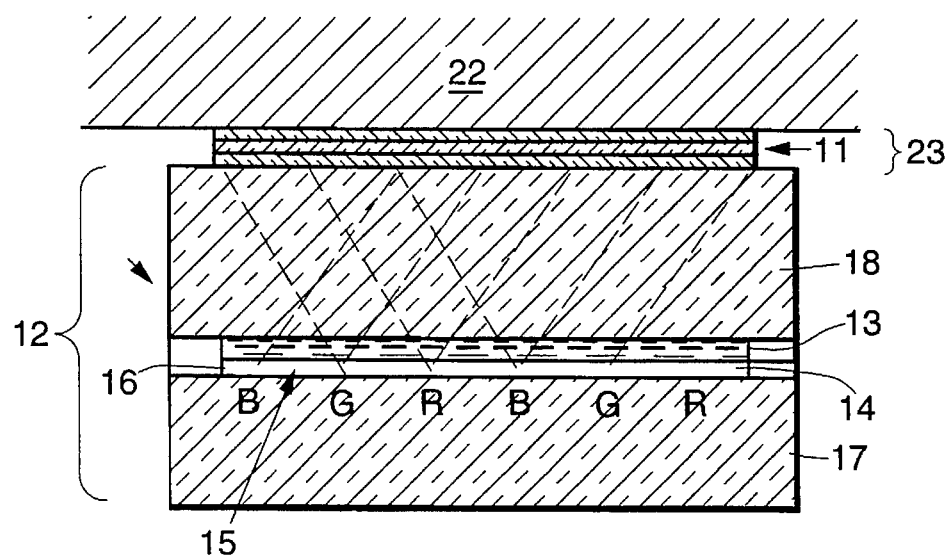
FIG. 1a illustrates an enlarged view of the off-axis holographic color filter of the display of FIG. 1.

Referring to the drawing figures, FIG. 1 shows a schematic diagram of a full-color liquid crystal display 10 employing an off-axis holographic color filter 11 in accordance with the present invention. FIG. 1a illustrates an enlarged view of the off-axis holographic color filter 11 of the display 10 of FIG. 1. The liquid crystal display 10 includes a liquid crystal spatial light modulator 12 that comprises a layer of liquid crystal material 13, a transparent plate 18 disposed on one surface of the layer of liquid crystal material 13, and a reflective electrode 14 disposed on the other surface of the layer of liquid crystal material 13. The reflective electrode 14 comprises a reflective surface 15 that is typically divided into a mosaic of electrically independent picture elements 16. Typically, the reflective surface 15 is deposited onto a substrate 17 containing means for providing electrical signals to the picture elements 16 that are used to spatially modulate the light passing through the spatial light modulator 12 by rotating the polarization of the light from S to P.

A light source 21 or illumination source 21 is provided that produces nearly collimated white predominantly S polarized illuminating light for illuminating the liquid crystal spatial light modulator 12. The illumination source 21 typically comprises an incandescent or metal halide lamp, reflective or refractive light collection optics, and a plate or prism polarizer. A prism element 22 is disposed adjacent to the holographic color filter 11 and couples the illuminating light from the illumination source 21 to the holographic color filter 11.

The holographic color filter 11 is disposed between the liquid crystal spatial light modulator 12 and the prism element 22. Referring to FIG. 1a, the holographic color filter 11 is comprised of three layers 23 of overlapping holographic lenses designed to focus red, green, and blue light, respectively, onto corresponding picture elements 16 of the spatial light modulator 12. The details regarding the holographic lenses are generally described in the Smith/Grinberg patent except that the holographic lenses are designed and fabricated to operate with the light incident at an acute angle (such as 75 degrees from normal to the film, for example) such that the hologram layers 23 diffract the S polarized incident light efficiently, but have low efficiency for P polarized light.

A polarizer 24 is disposed on an output surface of the prism element 22 that passes P polarized light but blocks S polarized light. A projection optical system 30, typically comprised of a projection lens 31 or lenses 31 and a front- or rear-projection screen 32 is disposed to receive P polarized light transmitted by the polarizer 24 and produce an image for viewing.

In operation, predominantly S polarized light from the illumination source 21 passes through the prism element 22 and impinges on the three holographic layers 23 of the holographic color filter 11. The blue hologram layer selects and focuses the blue component of the illuminating light onto blue elements 16 of the spatial light modulator 12. The green and red hologram layers 23 focus their respective colors onto corresponding green and red elements 16 of the spatial light modulator 12. Electrical signals are provided to the elements 16 of the spatial light modulator 12 to spatially modulate the light passing therethrough by rotating the polarization of the light from S to P where a bright pixel in the picture is desired, and by not rotating the polarization where a dark pixel of the picture is desired. The brightness of a given pixel may be varied from black to maximum by partially rotating the polarization of (i.e., imparting an elliptical polarization to) the reflected light. S polarized light reflected from the "dark" areas of the spatial light modulator 12 is primarily diffracted (back towards the illumination source 21) by the holographic lenses and partially transmitted to the polarizer 24 which blocks this light from reaching the projection optical system 30. The P polarized light reflected from the "bright" elements 16 of the spatial light modulator 12 is primarily transmitted though the holographic layers 23 of the holographic color filter 11 without diffraction. This light passes through the polarizer 24 and is projected onto the screen 32 to form a visible image.

Figure 2:
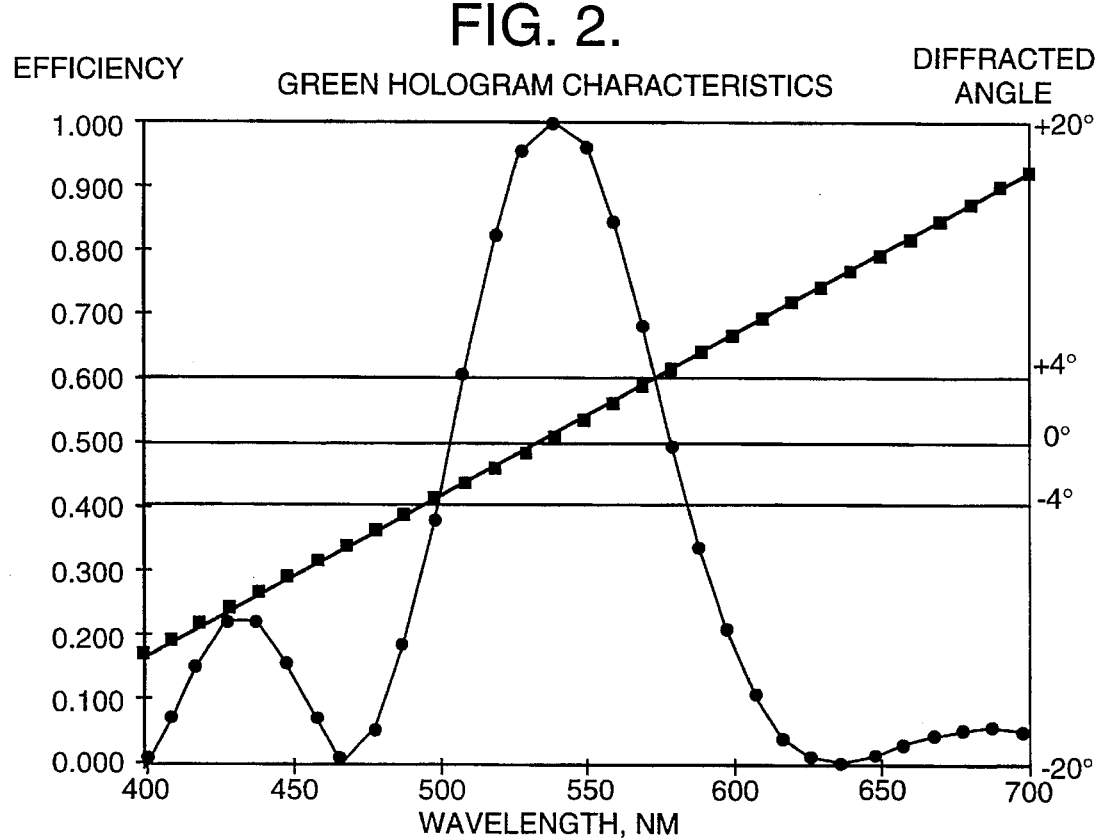
FIG. 2 is a graph showing efficiency versus wavelength of one hologram employed in the system and method of FIG. 1.

To achieve maximum usage of the incident light from the illumination source 21, the three layers 23 of holographic lenses should have wavelength bandwidths (at 50% of peak diffraction efficiency) of 80 to 100 nanometers. FIG. 2 shows a graph of efficiency versus wavelength and diffracted angle versus wavelength characteristics of a suitable green hologram. The green hologram does diffract some light in the blue (less than 500 nm) and orange/red (more than 590 nm) portions of the spectrum. To ensure that the image has sufficient color purity, these red and blue components should not be incident on the green element 16 of the spatial light modulator 12, but rather on the adjacent blue and red elements 16. The data in FIG. 2 shows that the green components of the incident light are diffracted between −4° and +4°, the blue components are diffracted at lower angles, and the red components are diffracted at higher angles. Thus the performance of the color filter 11 is optimum if the following conditions are met:

The picture elements 16 of the spatial light modulator 12 should subtend an angle of about ±4° (the exact optimum value depends on the bend angle and other design characteristics of the lens holograms). This occurs if the distance between the spatial light modulator 12 and the holograms (which is also equal to the focal length of the hologram lenses) is about 7.2 times the width of the elements 16 of the spatial light modulator 12. The elements 16 of the spatial light modulator 12 must be arranged in a repeating pattern of red, green and blue stripes running orthogonal to the direction of the incident illuminating light. The sequence of the stripes must be such that, with respect to each green stripe, the red stripe is located on the side closer to the illumination source 21 and the blue stripe is on the side farther from the illumination source 21.

Thus, an off-axis holographic color filter and a full-color liquid crystal display employing the off-axis holographic color filter have been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A full-color liquid crystal display comprising:
    a liquid crystal spatial light modulator that comprises a mosaic of electrically independent picture elements;
    an illumination source for producing nearly collimated predominantly white S polarized illuminating light;
    a holographic color filter disposed adjacent the liquid crystal spatial light modulator that comprises three layers of overlapping holographic lenses designed to focus red, green, and blue light, respectively, onto corresponding picture elements of the spatial light modulator;
    a prism element disposed adjacent to the holographic color filter for coupling the illuminating light from the illumination source to the holographic color filter;
    a polarizer disposed on an output surface of the prism element opposite from the holographic color filter that transmits P polarized light but blocks S polarized light; and
    a projection optical system disposed to receive P polarized light transmitted by the polarizer and produce an image for viewing.

2. The display of claim 1 wherein the liquid crystal spatial light modulator comprises a layer of liquid crystal material, a transparent plate having a transparent electrode facing the layer of liquid crystal material, and a reflective surface that is divided into a mosaic of electrically independent picture elements.

3. The display of claim 1 wherein the liquid crystal spatial light modulator comprises a layer of liquid crystal material, a transparent plate disposed on one surface of the layer of liquid crystal material, and a reflective electrode disposed on the other surface of the layer of liquid crystal material.

4. The display of claim 2 wherein the reflective surface is deposited onto a substrate containing means for providing electrical signals to the picture elements that are used to spatially modulate the light passing through the spatial light modulator 12 by rotating the polarization of the light.

5. The display of claim 1 wherein the light is rotated from S polarization to P polarization.

6. The display of claim 1 wherein the illumination source comprises an incandescent lamp, reflective light collection optics, and a polarizer.

7. The display of claim 6 wherein the polarizer comprises a plate polarizer.

8. The display of claim 6 wherein the polarizer comprises a prism polarizer.

9. The display of claim 1 wherein the illumination source comprises a metal halide lamp, refractive light collection optics, and a polarizer.

10. The display of claim 9 wherein the polarizer comprises a plate polarizer.

11. The display of claim 8 wherein the polarizer comprises a prism polarizer.

12. The display of claim 1 wherein the holographic lenses are designed and fabricated to operate with the light incident at an acute angle such that the hologram layers diffract the S polarized incident light efficiently, but have low efficiency for P polarized light.

13. The display of claim 12 wherein the holographic lenses are designed and fabricated to operate with the light incident at about 75 degrees from normal.

14. The display of claim 1 wherein the projection optical system comprises a projection lens and a front-projection screen.

15. The display of claim 1 wherein the projection optical system comprises a projection lens and a rear-projection screen.

* * * * *